(12) United States Patent
Takasaka et al.

(10) Patent No.: US 8,484,668 B2
(45) Date of Patent: Jul. 9, 2013

(54) DRIVE DEVICE FOR OPTICAL DISC APPARATUS

(75) Inventors: Daisuke Takasaka, Osaka (JP); Tetsuya Tamura, Osaka (JP); Masaki Nakatani, Osaka (JP); Katsuo Ichinohe, Osaka (JP); Rikiya Ueshima, Osaka (JP); Tomohiro Kobayashi, Osaka (JP); Yoshiyuki Nakagawa, Osaka (JP); Yasuhido Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 2 days.

(21) Appl. No.: 13/366,606

(22) Filed: Feb. 6, 2012

(65) Prior Publication Data
US 2012/0204198 A1    Aug. 9, 2012

(30) Foreign Application Priority Data
Feb. 7, 2011    (JP) ................................. 2011-024473

(51) Int. Cl.
*G11B 7/08* (2006.01)
(52) U.S. Cl.
USPC ........................................................ 720/672
(58) Field of Classification Search
USPC ........................................................ 720/652
See application file for complete search history.

(56) References Cited

U.S. PATENT DOCUMENTS

| 5,805,552 | A  | * | 9/1998  | Tozune et al. | 720/610 |
| 6,411,581 | B1 | * | 6/2002  | Saitou et al. | 720/652 |
| 7,243,358 | B2 | * | 7/2007  | Bae | 720/652 |
| 7,698,714 | B2 | * | 4/2010  | Choi | 720/601 |
| 8,341,656 | B2 | * | 12/2012 | Lin et al. | 720/652 |
| 2009/0044207 | A1 | | 2/2009 | Yamaguchi | |
| 2011/0191793 | A1 | * | 8/2011 | Ishizuka et al. | 720/652 |

FOREIGN PATENT DOCUMENTS

| JP | 2004-220658 | 8/2004 |
| JP | 2006-302437 | 11/2006 |
| JP | 2008-97762  | 4/2008 |
| JP | 2009-043351 | 2/2009 |

OTHER PUBLICATIONS

Japanese Office Action dated Dec. 4, 2012 for corresponding Patent Application No. JP2011-024473.

* cited by examiner

*Primary Examiner* — Mark Blouin
(74) *Attorney, Agent, or Firm* — Morgan, Lewis & Bockius LLP

(57) ABSTRACT

A drive device for an optical disc apparatus, comprising: a traverse chassis; a vertically moving lever arm for covering part of the lower surface of the traverse chassis and supporting the traverse chassis; a first circuit board disposed on the upper surface of the traverse chassis; a second circuit board disposed on the lower surface of the traverse chassis; and a flexible cable that passes between the traverse chassis and the lever arm, is connected by one end thereof to the first circuit board, and is connected by the other end thereof to the second circuit board; wherein an opening that has a greater width than the width of the flexible cable is provided to a section of the lever arm in contact with the flexible cable.

5 Claims, 33 Drawing Sheets

15  20

DRIVE DEVICE FOR OPTICAL DISC APPARATUS

This application is based on Japanese Patent Application No. 2011-024473 filed on Feb. 7, 2011, the contents of which are hereby incorporated by reference.

BACKGROUND OF THE INVENTION

1. Field of the Invention

The present invention relates to a drive device for an optical disc apparatus for recording on or playing a CD, DVD, BD (Blu-ray Disc), or other optical disc.

2. Description of Related Art

Apparatuses designed so that a disc tray on which an optical disc is placed is moved in the apparatus body, the optical disc is clamped between a disc holder (clamper) and a turntable provided in the apparatus body, and the optical disc is recorded on or played are conventionally known as optical disc apparatuses. Various improvements to the mechanisms of such tray-type optical disc apparatuses have also been proposed in recent years.

For example, there is disclosed in Japanese Laid-open Patent Publication No. 2008-97762 a disc apparatus designed so that a lever shifter is moved downward based on an unloading signal to tilt the orientation of a traverse chassis, whereby a disc is passed from a turntable onto a tray, and the tray is advanced forward; wherein a plurality of upwardly protruding trapezoidal mounting bases are formed by working sheet metal into the bottom chassis of a housing, a loader chassis is fixed on the mounting bases, a bar-shaped elastic buffering element extends integrally with the lever shifter so as to face any one of the mounting bases, and the elastic buffering element is made to contact the upper surface or the slanted lateral surface of the mounting bases and undergo elastic deformation when the lever shifter is moved downward to the lowest position.

There is also disclosed in Japanese Laid-open Patent Publication No. 2006-302437 an optical disc apparatus comprising: a tray unit for mounting a circular optical disc and moving forward and backward; an integrally formed unit mechanical chassis that includes an optical pickup and a disc motor for rotatably driving the optical disc; a printed circuit board that includes a signal processing circuit and a control circuit for controlling the disc motor, the optical pickup, and all the other devices; and a mechanical part for vertically moving the unit mechanical chassis in the housing in accordance with the forward and backward movement of the tray unit; wherein a notch is formed in the distal part of the circuit board, and an electrical connection between the unit mechanical chassis and the printed circuit board is formed using a flexible cable via the notch in order to avoid interference with the printed circuit board from the vertical movement of the unit mechanical chassis.

In addition, there is disclosed in Japanese Laid-open Patent Publication No. 2004-220658 an optical disc apparatus in which a chucking plate is attached to a hole formed in a PCB, the PCB is disposed above the disc, a pickup connector is disposed behind a disc tray, a pickup cable is connected to a pickup through the exterior of the disc tray, the heat-generating electrical components on the PCB are installed in an area facing the disc, and the electrical components on the PCB that have a greater height than the distance between the disc and the PCB are installed in an area not facing the disc.

The tray-type optical disc apparatus is a mechanism in which the traverse assembly is vertically moved by the vertical movement of a lever arm that supports the lower part of the front end of the traverse assembly. A spindle motor for rotating an optical disc is provided on a spindle motor PCB (printed board) in the section nearer the front of the upper surface of the traverse assembly. A spindle motor FFC (flexible flat cable) is connected to the spindle motor PCB, and the spindle motor FFC is extended from the front of the traverse assembly around the underside of the traverse assembly, passed between a traverse chassis and the lever arm, and connected to the PCB of the apparatus body.

Here, the spindle motor FFC cannot be assembled without a certain allowance in length, and the assembled spindle motor FFC is therefore somewhat loose. The loose section is pressed down by the lever arm, and the other sections of the spindle motor FFC are lifted, producing a state in which a load is applied.

As a result, the spindle motor PCB is lifted by the stress from the spindle motor FFC, and the components on the spindle motor PCB sometimes come into contact with the spindle motor. The rotational load of the spindle motor increases in this state, creating concern that defects will arise in recording on or playing an optical disc. Such problems will arise as long as there is an FFC passing between the lever arm and the traverse chassis even without a spindle motor, and these problems cannot be solved by the three cited technologies.

SUMMARY OF THE INVENTION

An object of the present invention is to provide a drive device for an optical disc apparatus having a configuration in which an excess load is not applied to an FFC that passes between a lever arm and a traverse chassis.

In order to achieve the aforementioned object, the present invention provides a drive device for an optical disc apparatus comprising: a traverse chassis; a vertically moving lever arm for covering part of a lower surface of the traverse chassis and supporting the traverse chassis; a first circuit board disposed on an upper surface of the traverse chassis; a second circuit board disposed on a lower surface of the traverse chassis; and a flexible cable that passes between the traverse chassis and the lever arm, is connected by one end thereof to the first circuit board, and is connected by the other end thereof to the second circuit board; wherein an opening having a greater width than the width of the flexible cable is provided to a section of the lever arm in contact with the flexible cable.

In the drive device for an optical disc apparatus, the opening is preferably a notch or a hole provided to a section facing the lower surface of the traverse chassis.

In the drive device for an optical disc apparatus, a spindle motor for rotating an optical disc is preferably mounted on the first circuit board.

In the drive device for an optical disc apparatus, the lever arm preferably has a bar on the side near the upper surface of the traverse chassis, the bar covers part of the flexible cable on the side near the first circuit board, and the bar has a protrusion for pressing down the flexible cable on the side near the flexible cable.

The present invention also provides a drive device for an optical disc apparatus comprising: a traverse chassis; a vertically moving lever arm for covering part of the traverse chassis and supporting the traverse chassis; a first circuit board disposed on an upper surface of the traverse chassis; a second circuit board disposed on a lower surface of the traverse chassis; and a flexible cable that passes between the traverse chassis and the lever arm, is connected by one end thereof to the first circuit board, and is connected by the other end thereof to the second circuit board; wherein the lever arm has a bar on the side near the upper surface of the traverse chassis, the bar covers part of the flexible cable on the side near the first circuit board, and the bar has a protrusion for pressing down the flexible cable on the side near the flexible cable.

According to the present invention, providing an opening and/or a protrusion on the lever arm allows the apparatus to have a configuration in which an excess load is not applied to the FFC that passes between the lever arm and the traverse chassis. For example, the spindle motor PCB is not lifted by the stress from the spindle motor FFC, and the components on the spindle motor PCB do not come into contact with the spindle motor. Accordingly, the spindle motor can rotate normally, and the optical disc can be recorded on or played normally as well.

DETAILED DESCRIPTION OF PREFERRED EMBODIMENTS

Figure 1A:
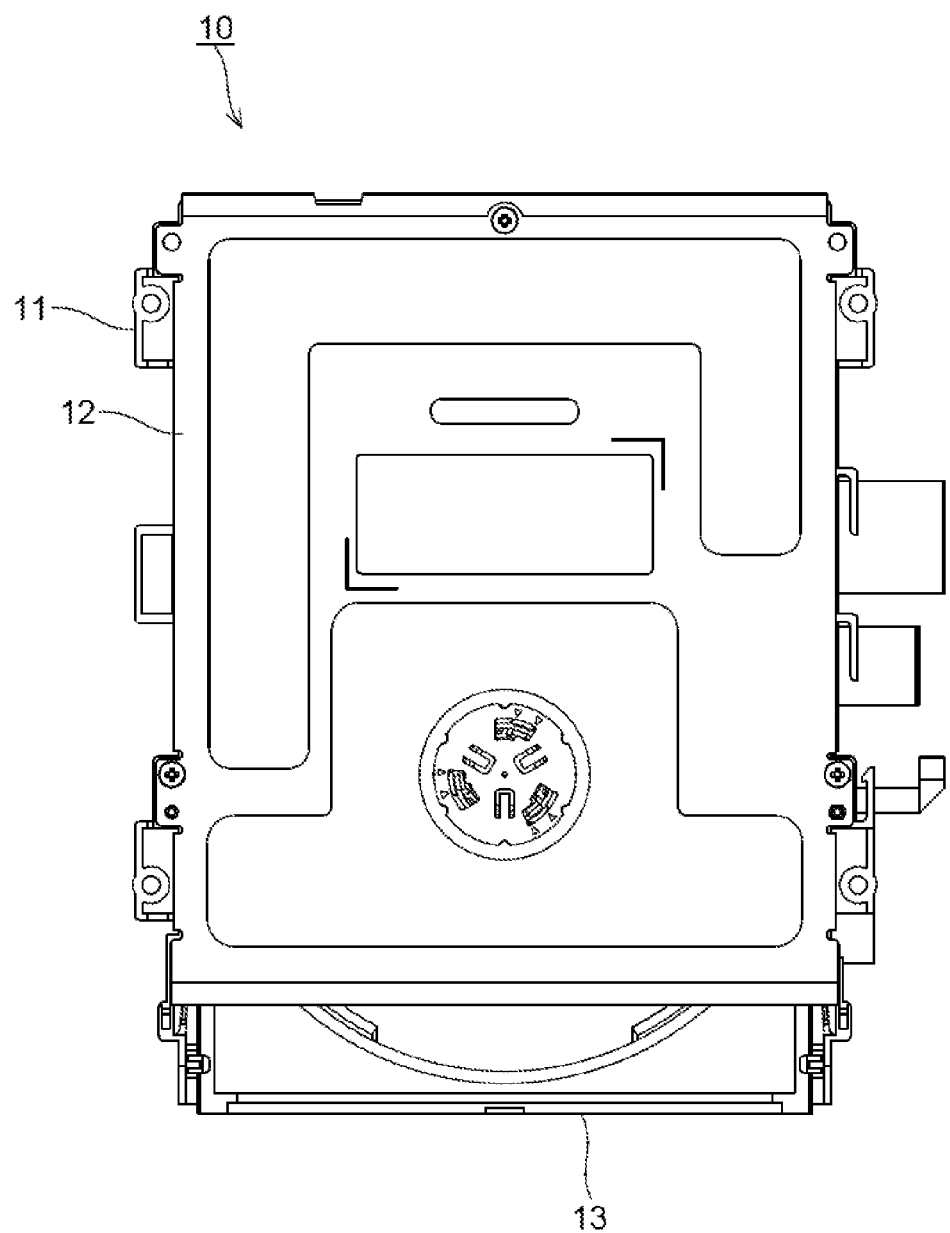
FIG. 1A is a plan view of a drive device for an optical disc apparatus according to the present invention.
Figure 1B:
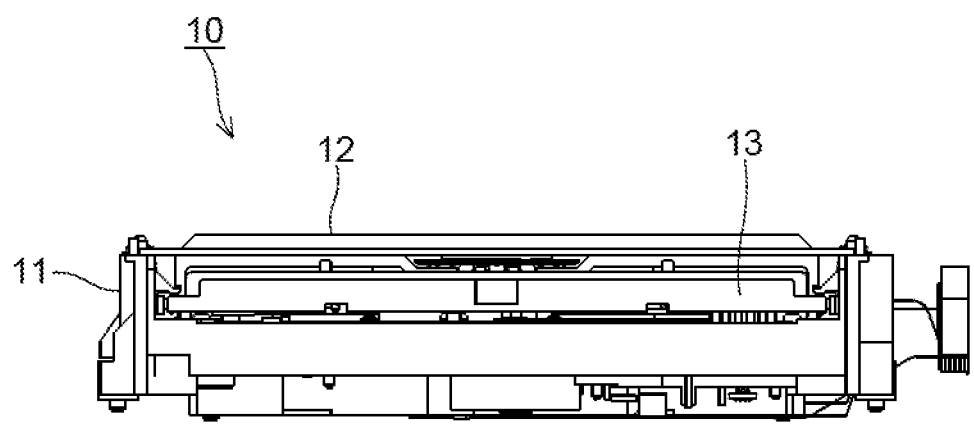
FIG. 1B is a front view of the drive device for an optical disc apparatus according to the present invention.
Figure 1C:
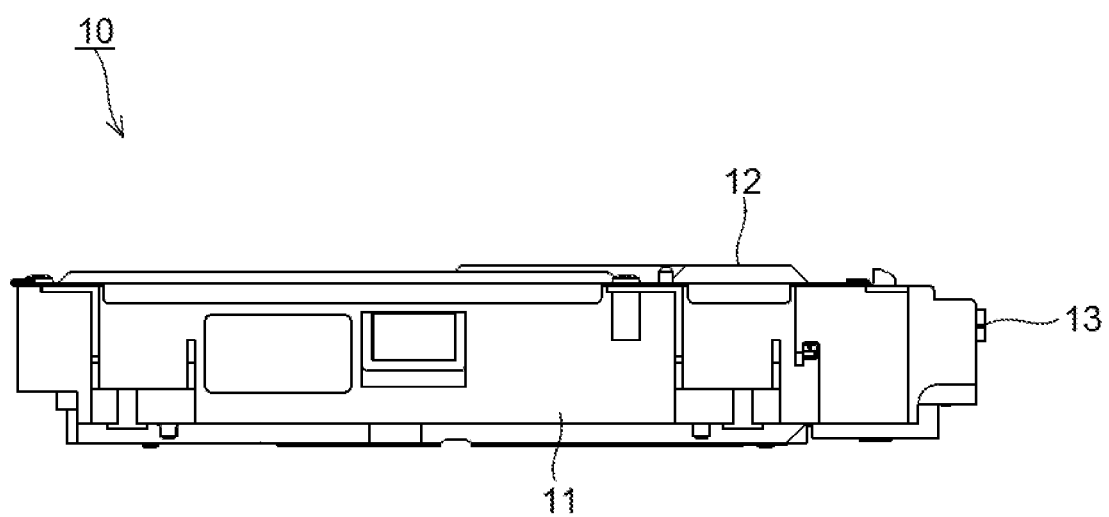
FIG. 1C is a left-side view of the drive device for an optical disc apparatus according to the present invention.
Figure 1D:
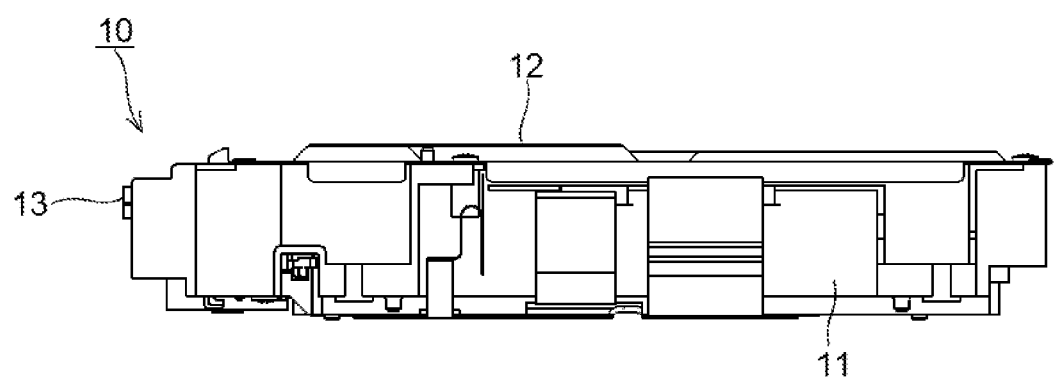
FIG. 1D is a right-side view of the drive device for an optical disc apparatus according to the present invention.
Figure 1E:
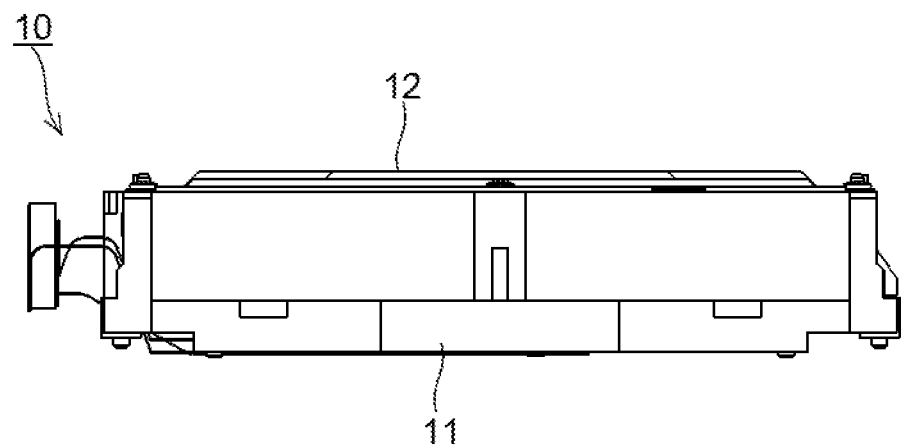
FIG. 1E is a back view of the drive device for an optical disc apparatus according to the present invention.
Figure 1F:
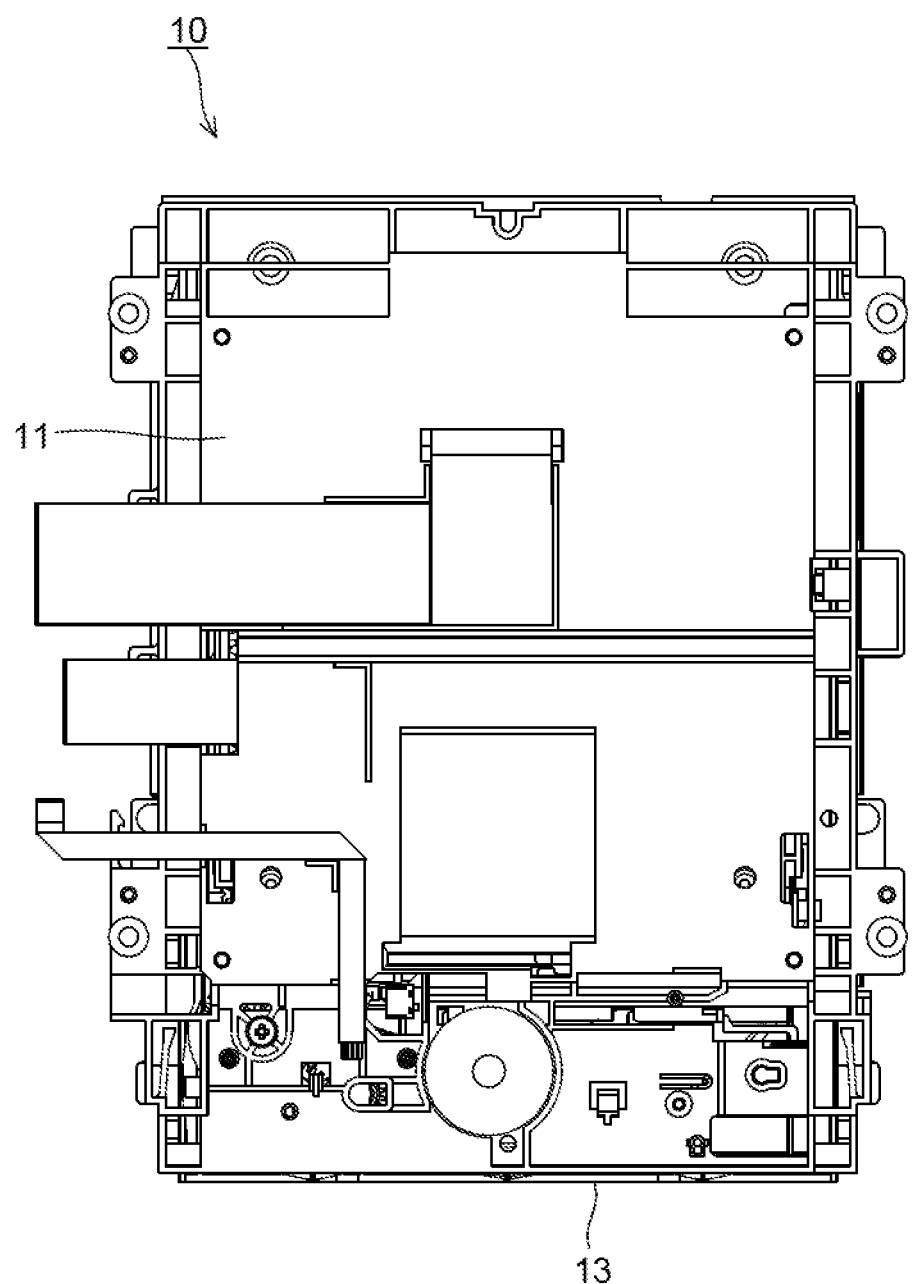
FIG. 1F is a bottom view of the drive device for an optical disc apparatus according to the present invention.
Figure 2A:
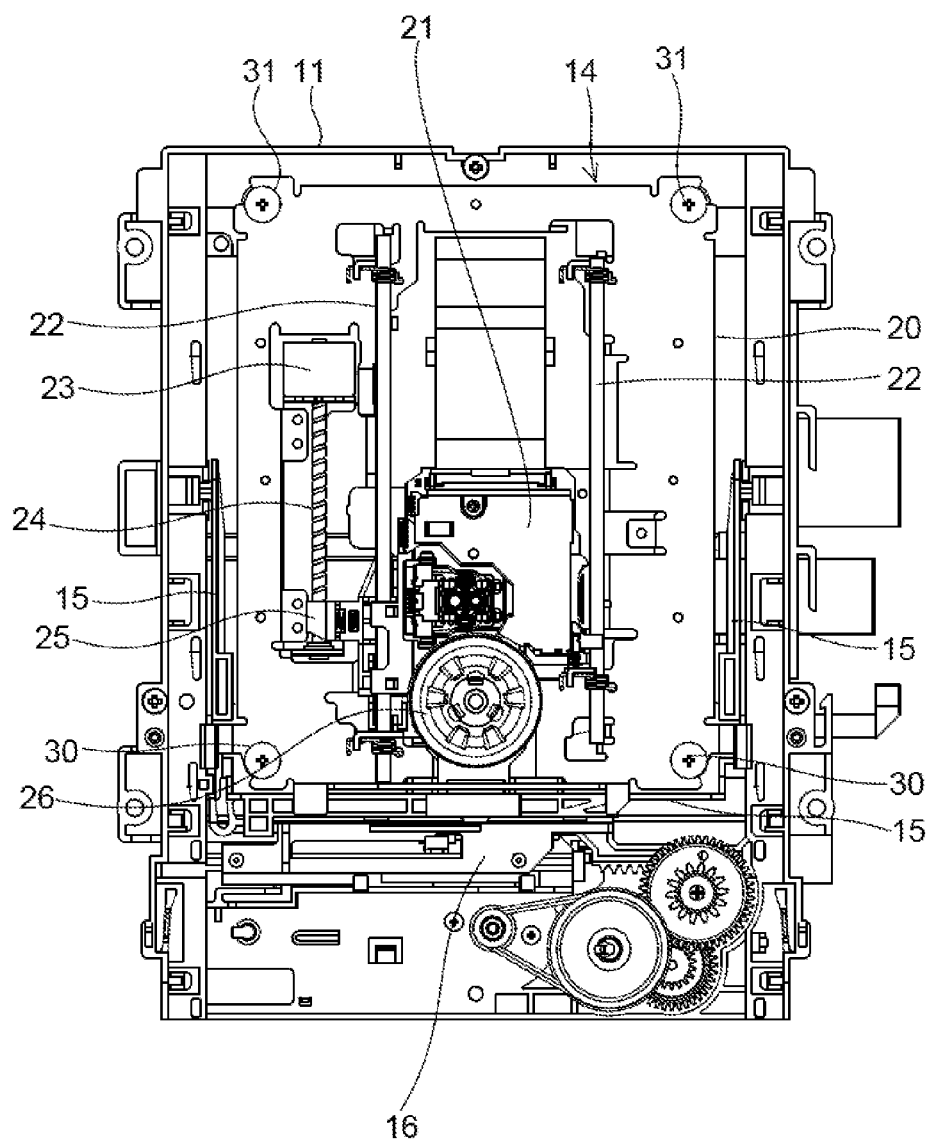
FIG. 2A is a view of FIG. 1A, with the cover and disc tray removed.
Figure 2B:
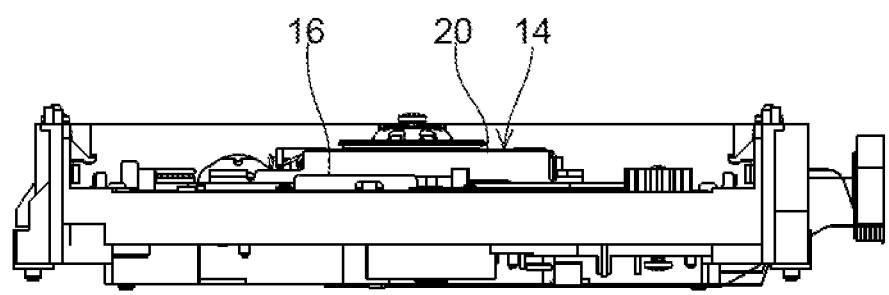
FIG. 2B is a view of FIG. 1B, with the cover and disc tray removed.
Figure 2C:
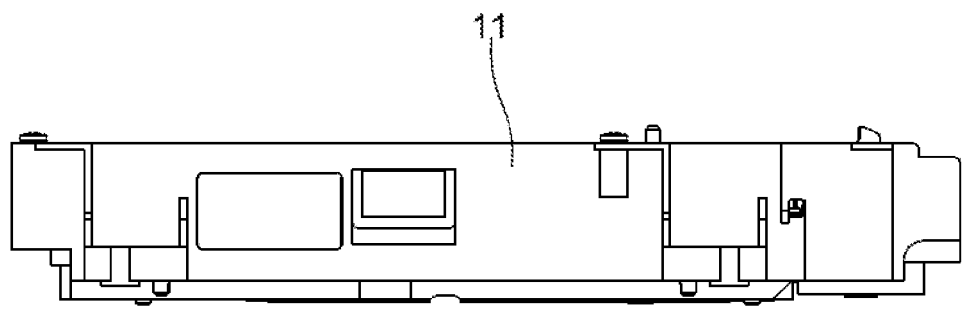
FIG. 2C is a view of FIG. 1C, with the cover and disc tray removed.
Figure 2D:
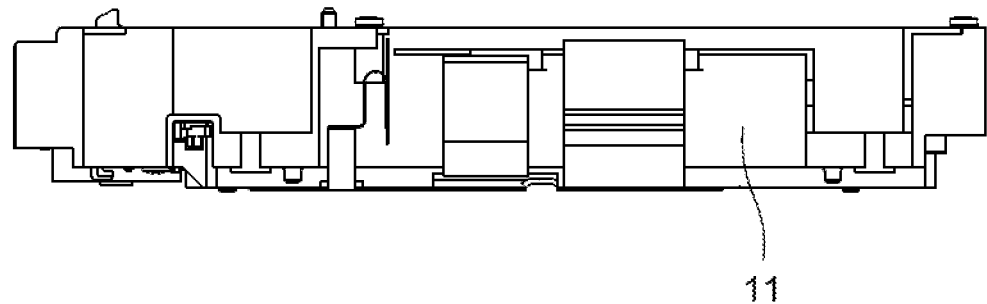
FIG. 2D is a view of FIG. 1D, with the cover and disc tray removed.
Figure 2E:
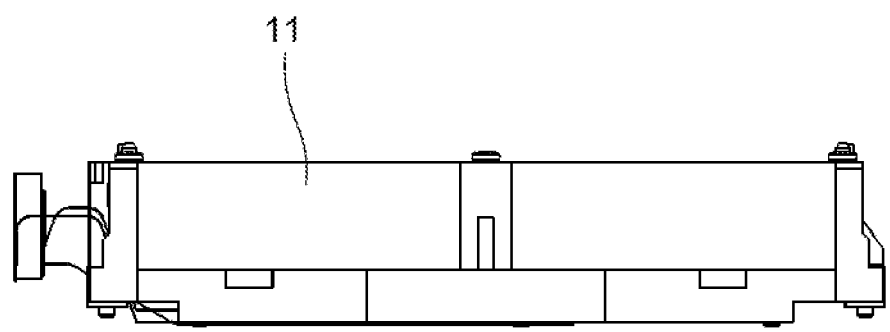
FIG. 2E is a view of FIG. 1E, with the cover and disc tray removed.
Figure 2F:
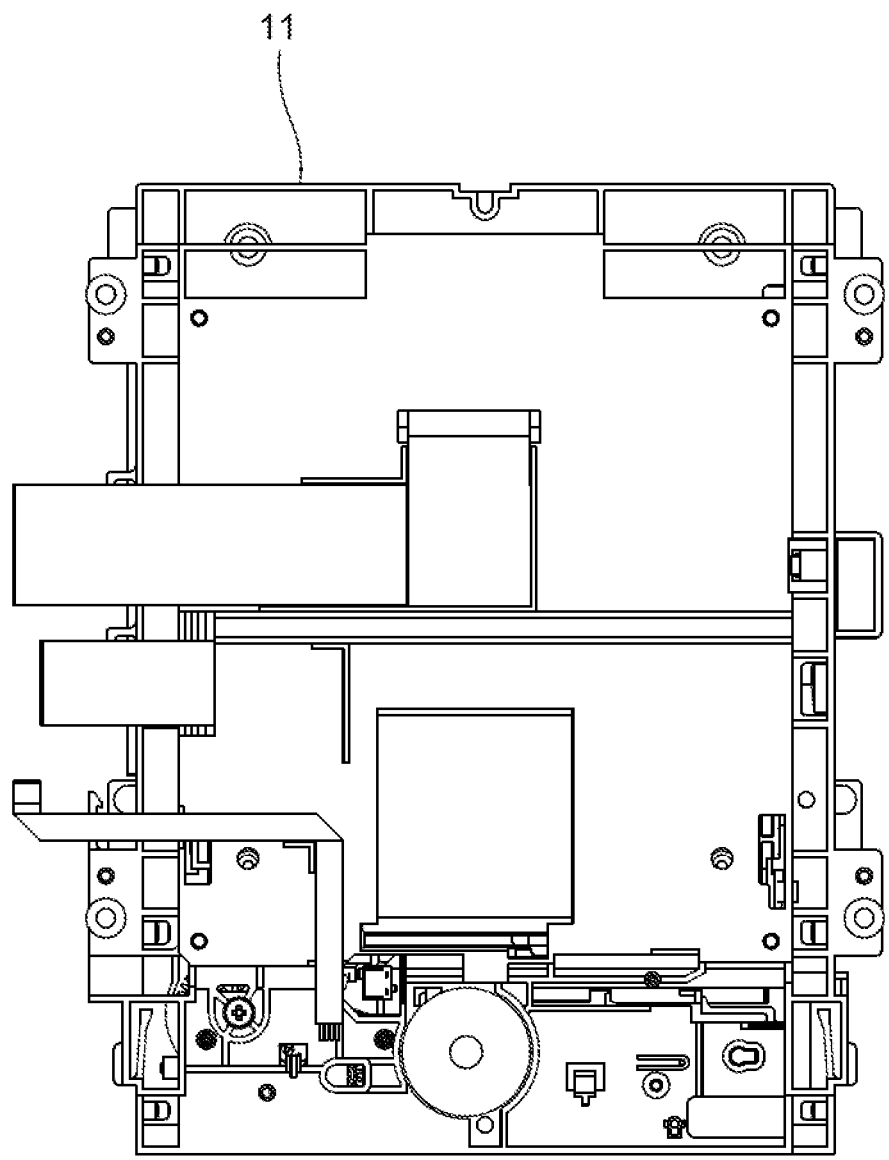
FIG. 2F is a view of FIG. 1F, with the cover and disc tray removed.

FIGS. 1A to 1F are six views of a drive device for an optical disc apparatus according to the present invention, where FIG. 1A is a plan view, FIG. 1B is a front view, FIG. 1C is a left-side view, FIG. 1D is a right-side view, FIG. 1E is a back view, and FIG. 1F is a bottom view. In addition, FIGS. 2A to 2F are views of FIGS. 1A to 1F, respectively, with the upper cover and disc tray removed.

A drive device 10 is accommodated in the housing of an apparatus body that forms the exterior of an optical disc apparatus. The drive device 10 comprises a loader chassis 11 for accommodating the members of the drive device 10, a cover 12 for covering the upper-surface opening of the loader chassis 11, a disc tray 13 for conveying an optical disc, a traverse assembly 14 capable of rotating and moving up and down in a direction substantially perpendicular (vertical direction) to the conveying direction (forward/backward direction) of the disc tray 13, a vertically moving lever arm 15 having a substantially U-shape in plan view and covering part (near the front end of the lower surface in the present embodiment) of the lower surface of the traverse assembly 14 as well as supporting the traverse assembly 14, a cam slider 16 for engaging as a cam with the front part of the lever arm 15 and moving in a left-right direction (direction substantially orthogonal to the conveying direction of the disc tray 13 and the up/downwardly moving direction of the traverse assembly 14) to vertically move the lever arm 15, and a motor (not shown) for driving the disc tray 13 and the cam slider 16 via a plurality of gears.

Figure 4A:
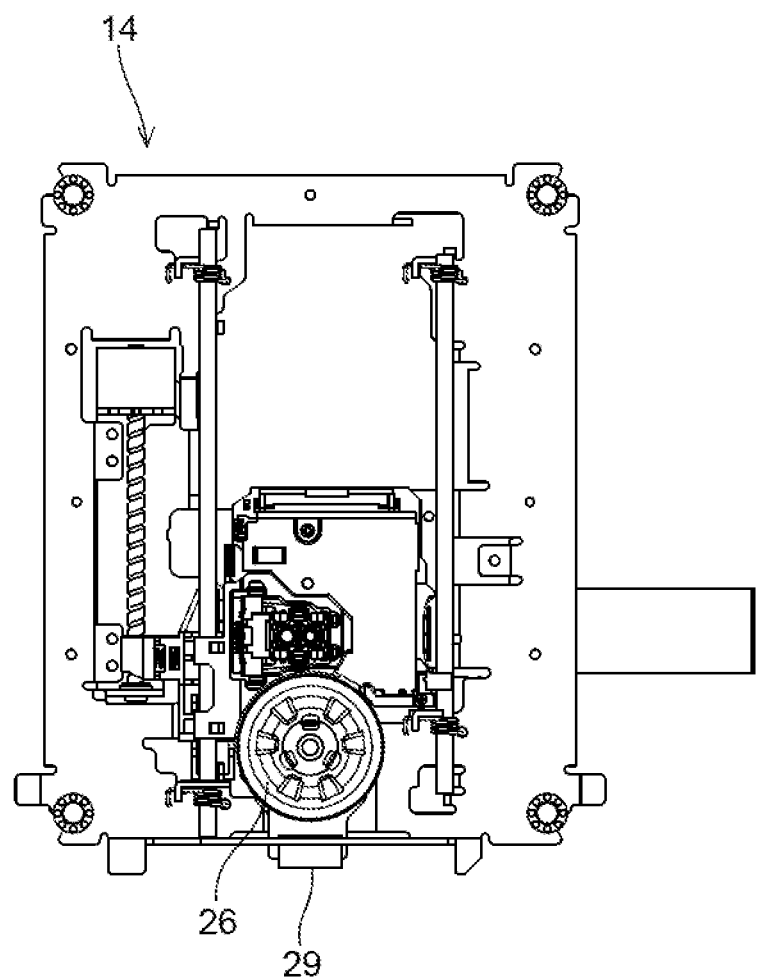
FIG. 4A is a plan view of the traverse assembly according to the present invention.

The traverse assembly 14 comprises a traverse chassis 20 for mounting the members; an optical pickup unit (OPU) 21; two guide shafts 22, 22 for supporting the OPU 21 while allowing movement in the radial direction (forward/backward direction) of the optical disc; a stepper motor 23 for driving the OPU 21; a lead screw 24 connected to the stepper motor 23; a tooth 25 fixed to the OPU 21 and meshed in engagement with the lead screw 24; a spindle motor 26 provided to the section near the front of the upper surface of the traverse chassis 20 and used for rotating the optical disc; a spindle motor PCB (printed board, first circuit board) 27 on which the spindle motor 26 is mounted (refer to FIG. 4B); a PCB (second circuit board) 28 provided to the lower surface of the traverse chassis 20 and used for controlling the entire drive device 10 (refer to FIG. 4F); and a spindle motor FFC (flexible flat cable) 29 connected by one end to the spindle motor PCB 27, extended from the front of the traverse chassis 20 around the underside of the traverse chassis 20, passed between the traverse chassis 20 and the lever arm 15, and connected by the other end to the PCB 28 (refer to FIG. 4A). The FFC may also be a simple non-flat flexible cable.

The traverse assembly 14 is locked to the lever arm 15 by locking parts 30, 30 at two points on the front end of the traverse chassis 20, and is locked to the loader chassis 11 by locking parts 31, 31 at two points on the back end of the traverse chassis 20. The locking parts 30, 31 are rubber O-rings and screws.

In the optical disc apparatus configured as described above, the disc tray 13 is conveyed in the disc device 10 by the driving of the motor when an optical disc is placed on the disc tray 13 in a pulled-out state. When the disc tray 13 is disposed at a specified position, transmission of the driving power of the motor to the disc tray 13 is canceled to stop the disc tray 13, the cam slider 16 is moved by the driving of the motor, and the traverse assembly 14 is raised. The traverse assembly 14 is thereby engaged with the optical disc, and the optical disc is chucked.

Transmission of the driving power of the motor to the cam slider 16 is cancelled and the cam slider 16 and the traverse assembly 14 are stopped when the optical disc is chucked. The OPU 21 is then moved to a specified position by the driving of the stepper motor 23, and the optical disc is recorded on or played. In addition, an operation opposite to that described above is performed when the optical disc is removed.

Figure 3A:
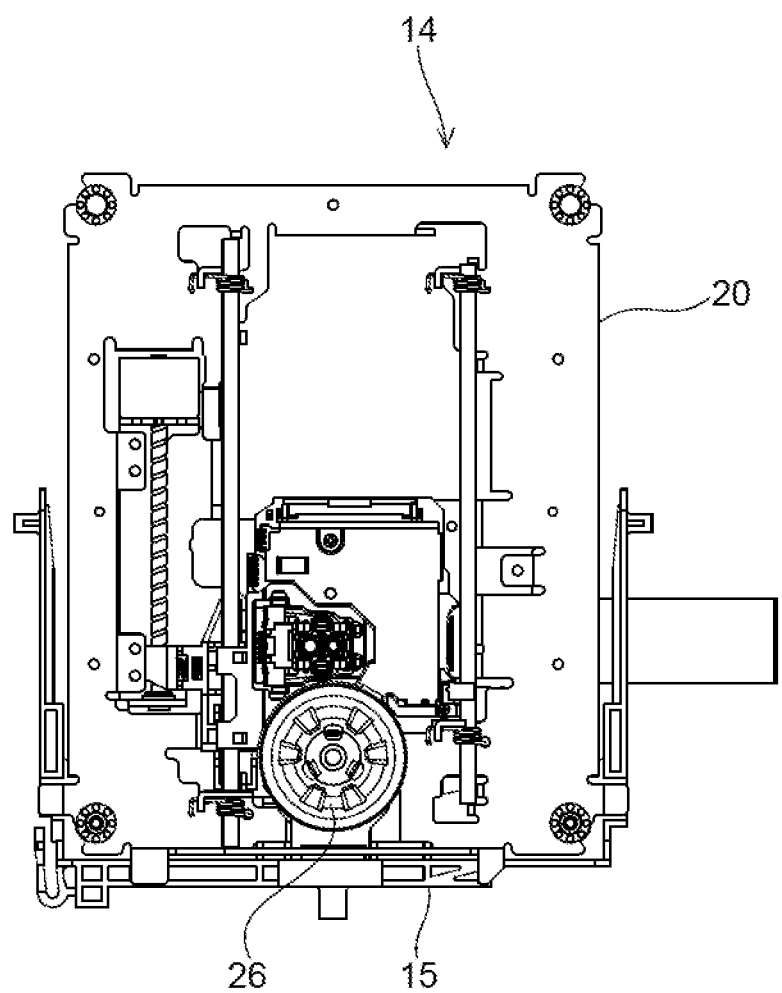
FIG. 3A is a plan view of the traverse assembly and the lever arm according to the present invention.
Figure 3B:
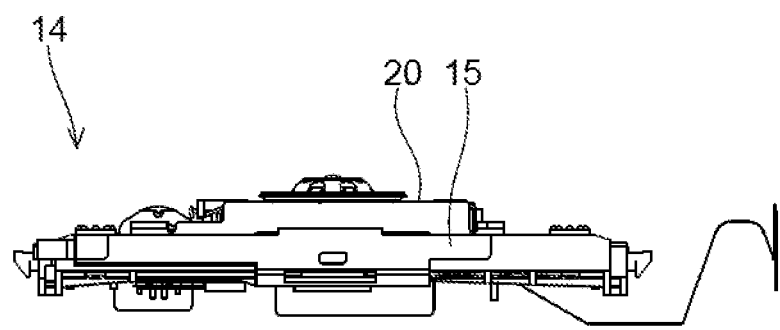
FIG. 3B is a front view of the traverse assembly and the lever arm according to the present invention.
Figure 3C:
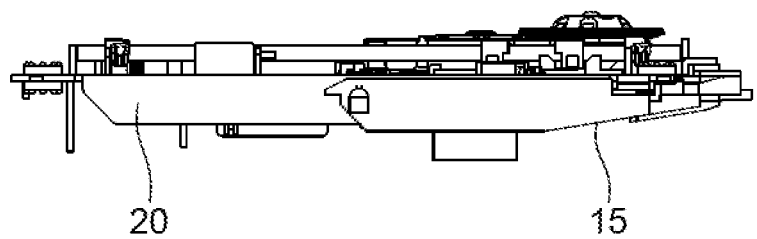
FIG. 3C is a left-side view of the traverse assembly and the lever arm according to the present invention.
Figure 3D:
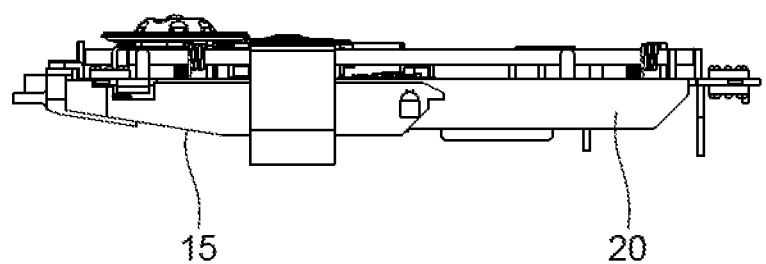
FIG. 3D is a right-side view of the traverse assembly and the lever arm according to the present invention.
Figure 3E:
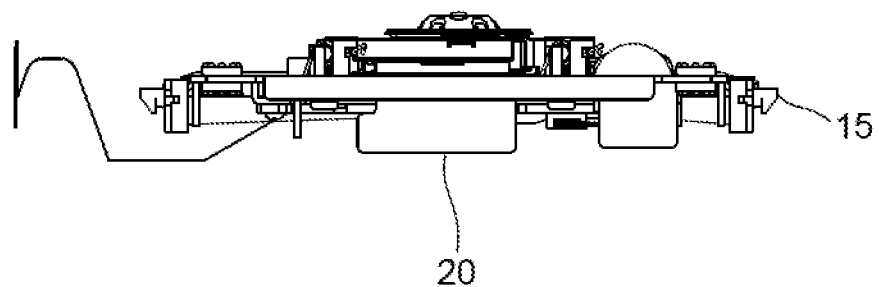
FIG. 3E is a back view of the traverse assembly and the lever arm according to the present invention.
Figure 3F:
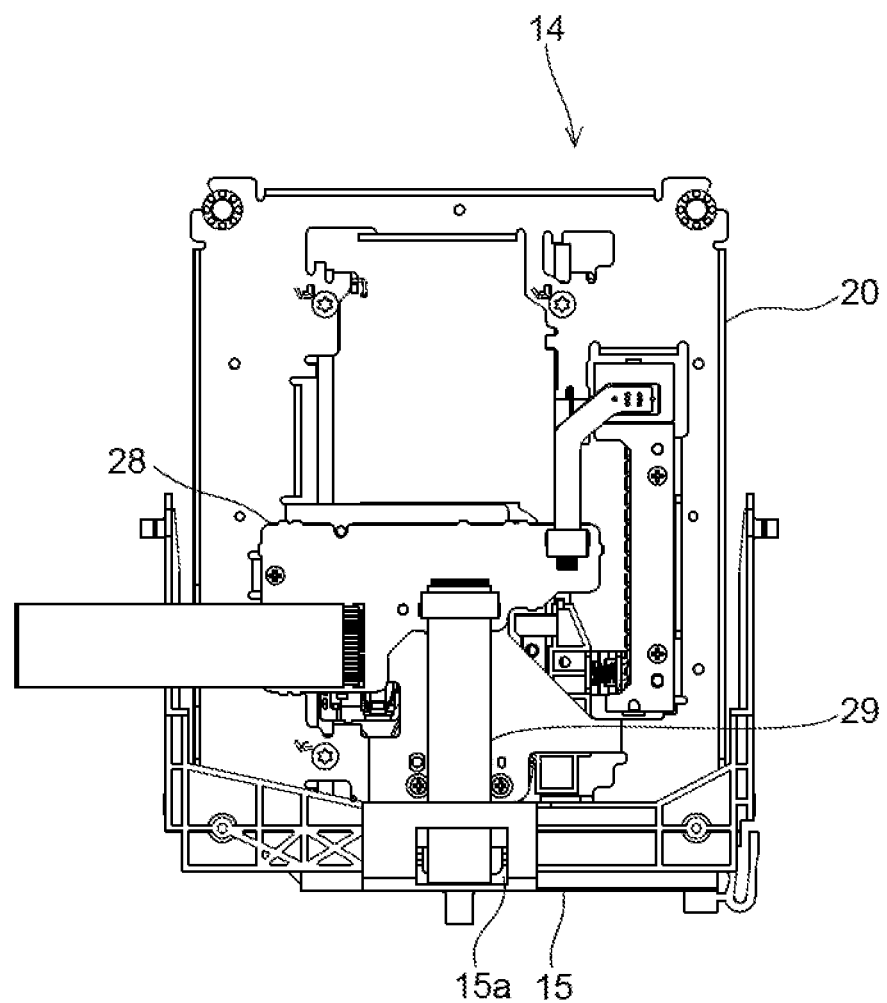
FIG. 3F is a bottom view of the traverse assembly and the lever arm according to the present invention.
Figure 4B:
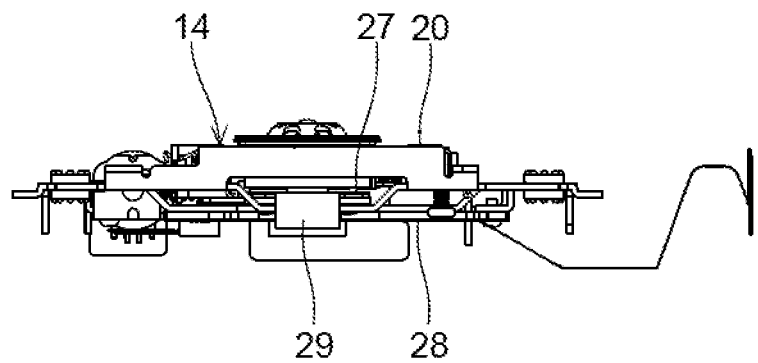
FIG. 4B is a front view of the traverse assembly according to the present invention.
Figure 4C:
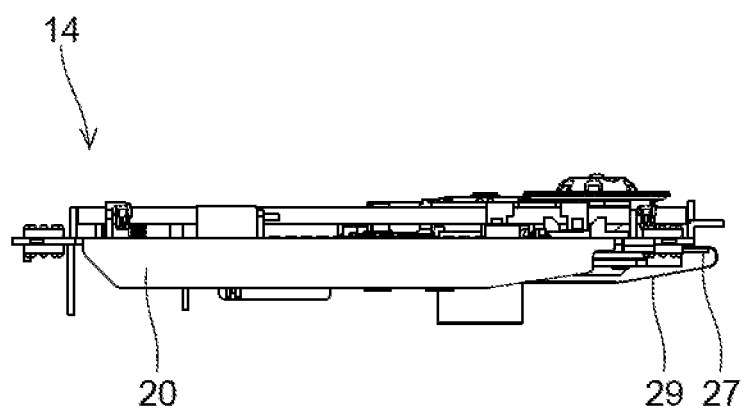
FIG. 4C is a left-side view of the traverse assembly according to the present invention.
Figure 4D:
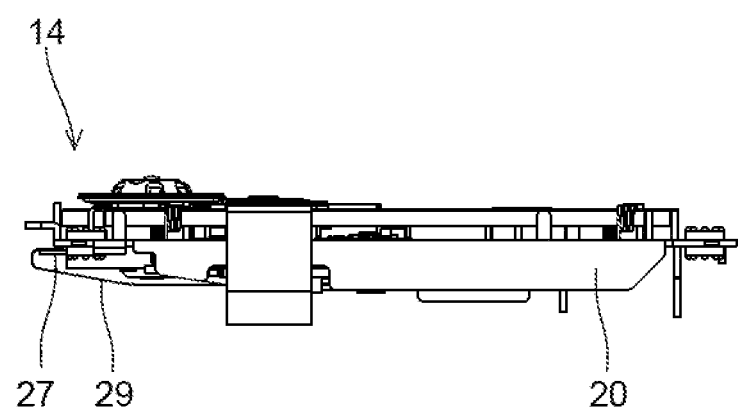
FIG. 4D is a right-side view of the traverse assembly according to the present invention.
Figure 4E:
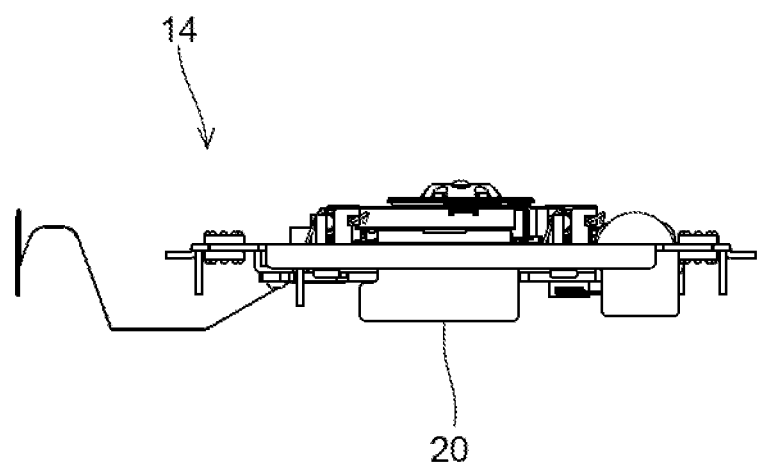
FIG. 4E is a back view of the traverse assembly according to the present invention.
Figure 4F:
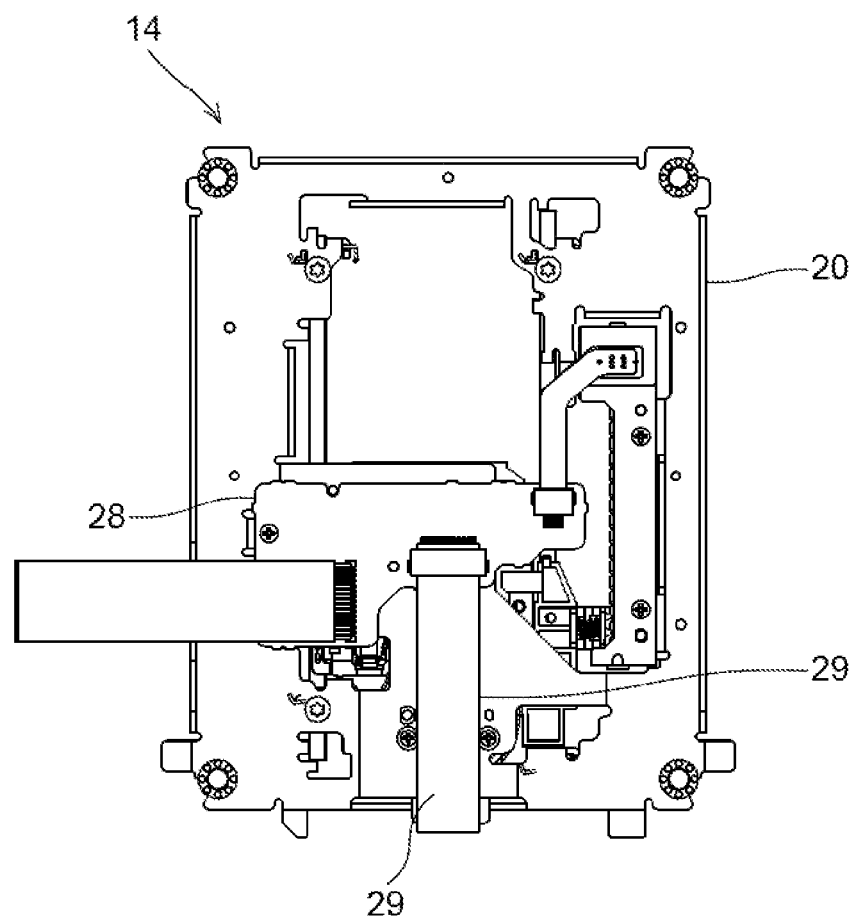
FIG. 4F is a bottom view of the traverse assembly according to the present invention.
Figure 5A:
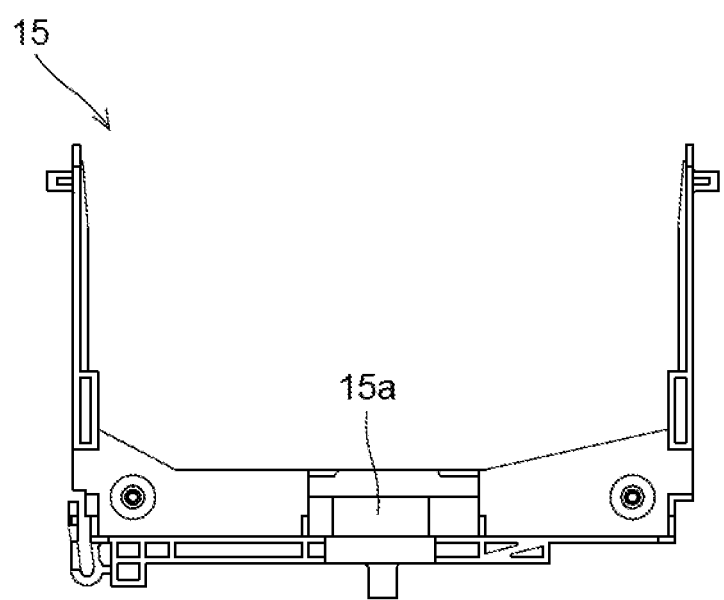
FIG. 5A is a plan view of the lever arm according to the present invention.
Figure 5B:
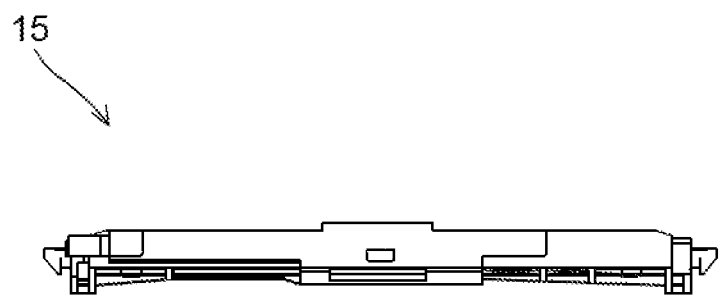
FIG. 5B is a front view of the lever arm according to the present invention.
Figure 5C:
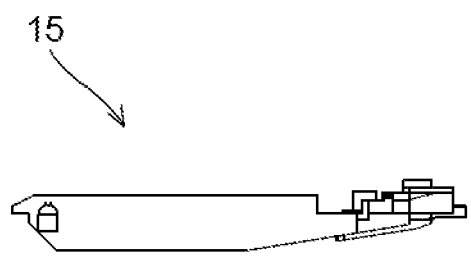
FIG. 5C is a left-side view of the lever arm according to the present invention.
Figure 5D:
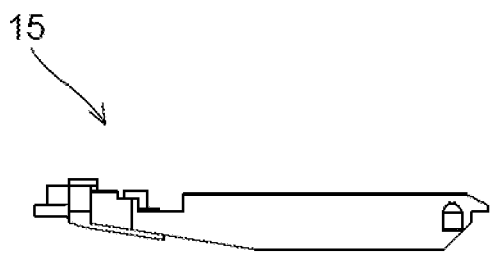
FIG. 5D is a right-side view of the lever arm according to the present invention.
Figure 5E:
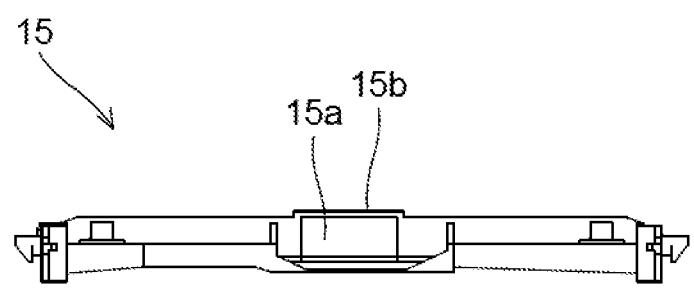
FIG. 5E is a back view of the lever arm according to the present invention.
Figure 5F:
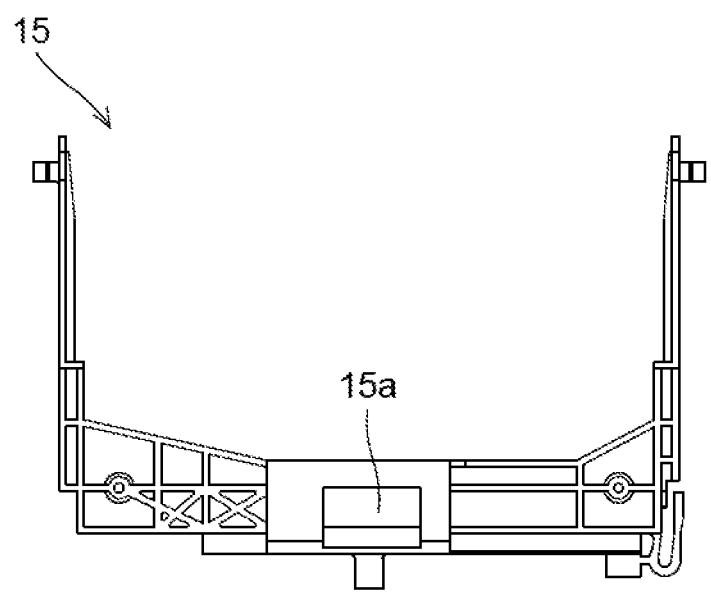
FIG. 5F is a bottom view of the lever arm according to the present invention.

The configuration of the area peripheral to the spindle motor FFC 29 will be described in detail below. FIGS. 3A to 3F are six views of the traverse assembly 14 and the lever arm 15, where FIG. 3A is a plan view, FIG. 3B is a front view, FIG. 3C is a left-side view, FIG. 3D is a right-side view, FIG. 3E is a back view, and FIG. 3F is a bottom view. FIGS. 4A to 4F are six views of the traverse assembly 14, where FIG. 4A is a plan view, FIG. 4B is a front view, FIG. 4C is a left-side view, FIG. 4D is a right-side view, FIG. 4E is a back view, and FIG. 4F is a bottom view. FIGS. 5A to 5F are six views of the lever arm 15, where FIG. 5A is a plan view, FIG. 5B is a front view, FIG. 5C is a left-side view, FIG. 5D is a right-side view, FIG. 5E is a back view, and FIG. 5F is a bottom view.

An opening 15a having a width greater than the width of the spindle motor FFC 29 is provided to the section of the lever arm 15 in contact with the spindle motor FFC 29. The opening 15a may be a hole such as that shown in the drawing, or may be a notch obtained by cutting away part of the area around the hole.

Specifically, the opening 15a is a section of the lever arm 15 facing the lower surface of the traverse chassis 20, and the opening is formed in the section facing the spindle motor FFC 29. The shape of the opening 15a is not particularly limited, and may be a circle, an oval, a triangle, a pentagon or other polygon, or the like in addition to the pictured rectangle. The opening 15a may also extend around to the front surface of the lever arm 15.

The spindle motor FFC 29 cannot be assembled without a certain allowance in length, and the assembled spindle motor FFC 29 is therefore somewhat loose. Without the presence of the opening 15a, the loose section would be pressed down by the lever arm 15, and the other sections of the spindle motor FFC 29 would be lifted, producing a state in which a load is applied. However, providing the opening 15a allows the loose section to escape through the opening 15a, preventing the other sections of the spindle motor FFC 29 from being lifted and a load from being applied.

As a result, the spindle motor PCB 27 is not lifted by the stress from the spindle motor FFC 29, and the components on the spindle motor PCB 27 do not come into contact with the spindle motor 26. Accordingly, the spindle motor 26 can rotate normally, and the optical disc can be recorded on or played normally as well.

Figure 6:
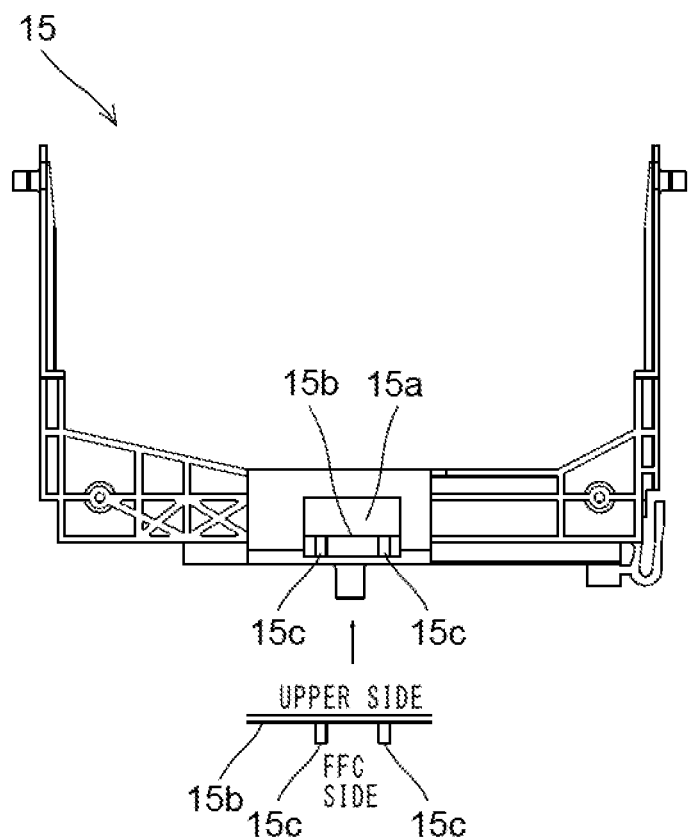
FIG. 6 is a bottom view of the lever arm having a bar and a protrusion according to the present invention.

In addition, the lever arm 15 may have a bar and a protrusion. FIG. 6 is a bottom view of the lever arm having a bar and a protrusion. The lever arm 15 has a bar 15b on the side near the upper surface of the traverse chassis 20, the bar 15b covers part of the spindle motor FFC 29 on the side near the spindle motor PCB 27, and the bar 15b has two cuboid-shaped protrusions 15c, 15c for pressing down the spindle motor FFC 29 on the side near the spindle motor FFC 29. There may be more than one protrusion 15c.

The bar 15b faces the opening 15a and functions to reinforce the strength of the lever arm 15 weakened by the formation of the opening 15a. The shape of the bar 15b is not particularly limited and may be a curved shape or the like in addition to a thin tabular shape such as that shown in the drawing.

Figure 7:
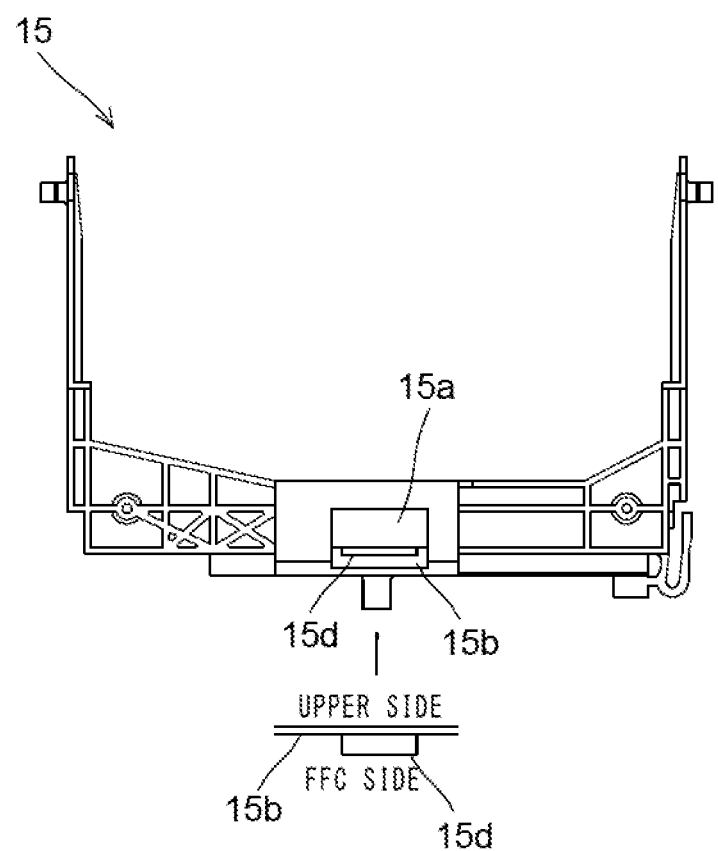
FIG. 7 is a bottom view of the lever arm having a bar and a protrusion according to the present invention.
Figure 8:
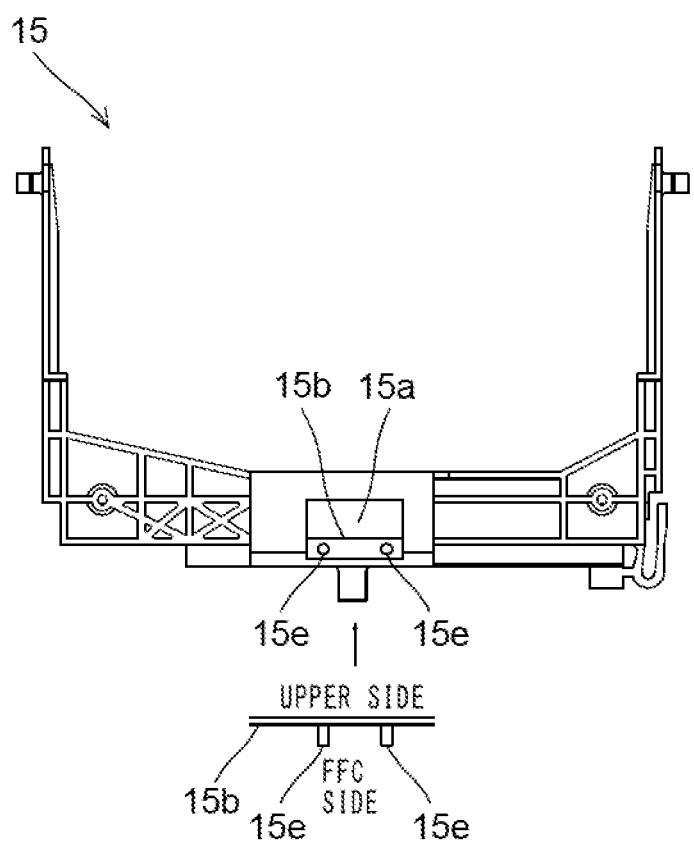
FIG. 8 is a bottom view of the lever arm having a bar and a protrusion according to the present invention.

In addition, the shape of the protrusion is not particularly limited and may be, for example, that of a rib-shaped protrusion 15d such as that shown in FIG. 7, or that of two columnar protrusions 15e, 15e such as those shown in FIG. 8.

Providing the lever arm 15 with a bar and a protrusion in such a manner causes the part of the spindle motor FFC 29 on the side near the upper surface of the traverse chassis 20 to be pressed down by the protrusion, preventing the spindle motor FFC 29 on the side near the upper surface of the traverse chassis 20 from being lifted and a load from being applied to the connection with the spindle motor PCB 27.

As a result, the spindle motor PCB 27 is not lifted by the stress from the spindle motor FFC 29, and the components on the spindle motor PCB 27 do not come into contact with the spindle motor 26. Accordingly, the spindle motor 26 can rotate normally, and the optical disc can be recorded on or played normally as well.

It is apparent that the effects of the present invention can be obtained by providing both an opening and a protrusion, and the effects can also be obtained when only an opening is provided and when only a protrusion is provided.

In addition, the present invention can be applied using a cable other than a spindle motor FFC, as long as there is a flexible cable passing between the lever arm and the traverse chassis.

The present invention can be used for an optical disc apparatus for recording on and playing a CD, DVD, BD, or the like. Examples include BD/DVD players, BD/DVD recorders, BD/DVD recorders integrated with a TV, personal computers provided with a BD/DVD recorder/player, and the like.

What is claimed is:

1. A drive device for an optical disc apparatus, comprising:
a traverse chassis;
a vertically moving lever arm for covering part of a lower surface of the traverse chassis and supporting the traverse chassis;
a first circuit board disposed on an upper surface of the traverse chassis;
a second circuit board disposed on a lower surface of the traverse chassis; and
a flexible cable that passes between the traverse chassis and the lever arm, is connected by one end thereof to the first circuit board, and is connected by the other end thereof to the second circuit board;
wherein an opening having a greater width than the width of the flexible cable is provided to a section of the lever arm in contact with the flexible cable.

2. The drive device for an optical disc apparatus according to claim 1, wherein the opening is a notch or a hole provided to a section facing the lower surface of the traverse chassis.

3. The drive device for an optical disc apparatus according to claim 1, wherein a spindle motor for rotating an optical disc is mounted on the first circuit board.

4. The drive device for an optical disc apparatus according to claim 1, wherein the lever arm has a bar on the side near the upper surface of the traverse chassis, the bar covers part of the flexible cable on the side near the first circuit board, and the bar has a protrusion for pressing down the flexible cable on the side near the flexible cable.

5. A drive device for an optical disc apparatus, comprising:
- a traverse chassis;
- a vertically moving lever arm for covering part of the traverse chassis and supporting the traverse chassis;
- a first circuit board disposed on an upper surface of the traverse chassis;
- a second circuit board disposed on a lower surface of the traverse chassis; and
- a flexible cable that passes between the traverse chassis and the lever arm, is connected by one end thereof to the first circuit board, and is connected by the other end thereof to the second circuit board;
- wherein the lever arm has a bar on the side near the upper surface of the traverse chassis, the bar covers part of the flexible cable on the side near the first circuit board, and the bar has a protrusion for pressing down the flexible cable on the side near the flexible cable.

\* \* \* \* \*